United States Patent [19]

Barry et al.

[11] Patent Number: 5,488,996
[45] Date of Patent: Feb. 6, 1996

[54] FORWARD-FOLDING, WINGED, IMPLEMENT FRAME

[75] Inventors: Alan F. Barry, Fairfax; Harry C. Deckler, Williamsburg, both of Iowa

[73] Assignee: Kinze Manufacturing, Inc., Williamsburg, Iowa

[21] Appl. No.: 270,053

[22] Filed: Jul. 1, 1994

[51] Int. Cl.$^6$ .................... A01B 49/00; A01B 63/32
[52] U.S. Cl. ................................ 172/311; 172/456
[58] Field of Search .................. 172/310, 311, 172/456, 457, 458, 467, 315, 316, 329, 507; 280/412, 413; 111/57

[56] References Cited

U.S. PATENT DOCUMENTS

| | | |
|---|---|---|
| 3,791,673 | 2/1974 | Hornung . |
| 4,137,852 | 2/1979 | Pratt . |
| 4,171,022 | 10/1979 | Applequist . |
| 4,319,643 | 3/1982 | Carter et al. ............... 172/311 |
| 4,364,581 | 12/1982 | Shoup . |
| 4,576,238 | 3/1986 | Spencer ..................... 172/311 |
| 4,763,915 | 8/1988 | Risser . |
| 5,024,279 | 6/1991 | Warner et al. .............. 172/311 |
| 5,113,956 | 5/1992 | Friesen et al. ............. 172/371 |
| 5,232,054 | 8/1993 | Van Blardcon et al. .... 172/311 |

OTHER PUBLICATIONS

"Track Eradicator", Article in Farm Show, The Best of, 1990 Ed.

Primary Examiner—Terry Lee Melius
Assistant Examiner—Spencer Warnick
Attorney, Agent, or Firm—Emrich & Dithmar

[57] ABSTRACT

An improved frame for a drawn agricultural implement, such as a planter, includes a central main frame which is extensible. As the main frame extends, the wing sections fold forwardly. When the wing sections fold to a predetermined position, positioning links act to pull the main wheel set, which is mounted to a carriage and supports the rear of the central main frame, forwardly so that the down load on the hitch is reduced. Conversely, during the unfold cycle, after the wing sections have unfolded to a predetermined position, as unfolding continues, the positioning links urge the carriage and main wheel set toward the rear of the main frame to the field use position. A hydraulic circuit for folding, unfolding and preparing the implement for transport is also disclosed.

14 Claims, 11 Drawing Sheets

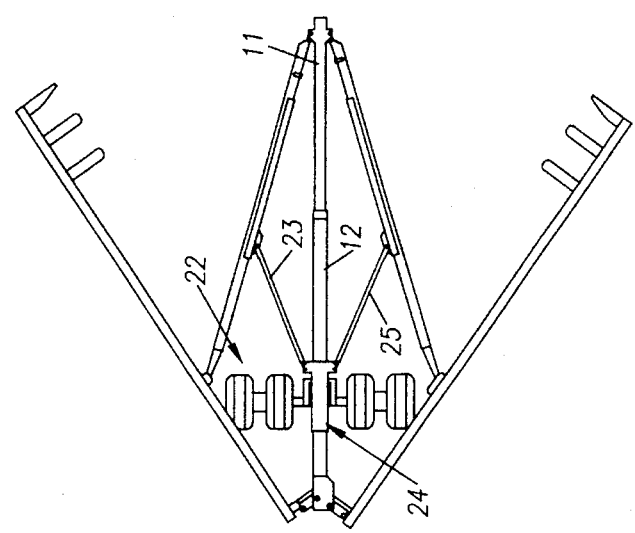
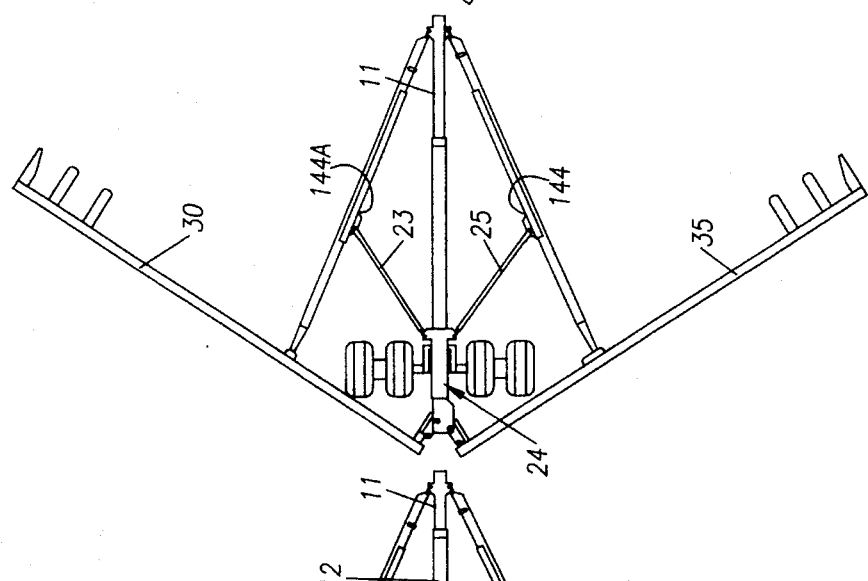
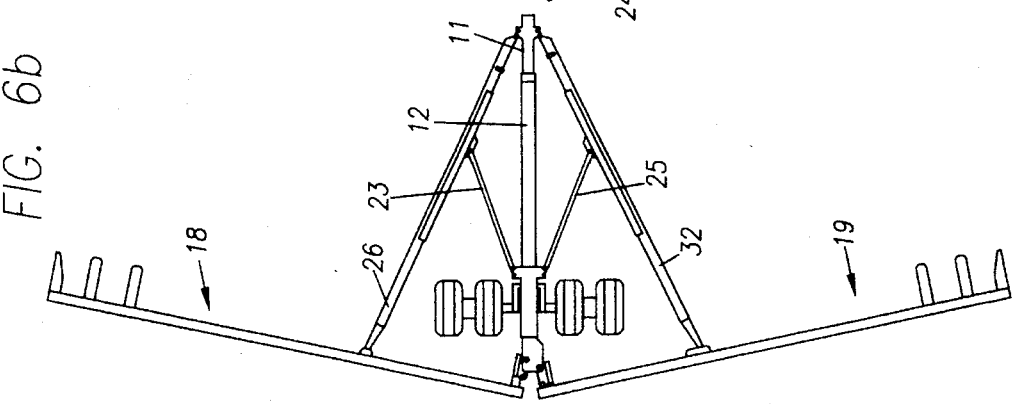
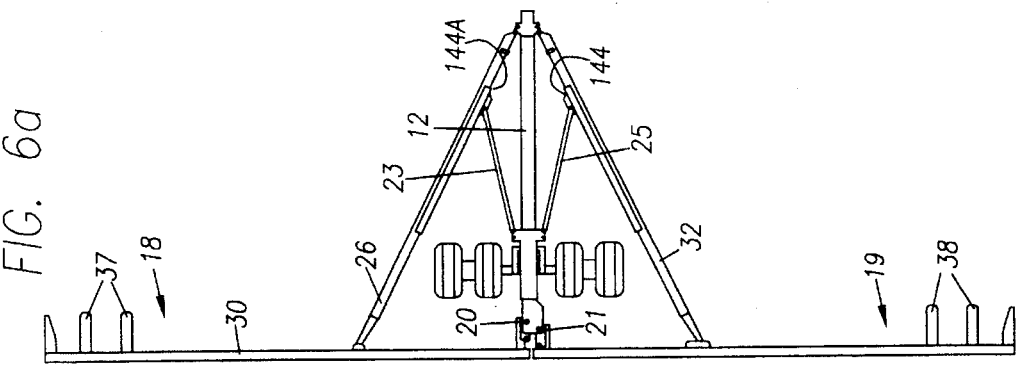

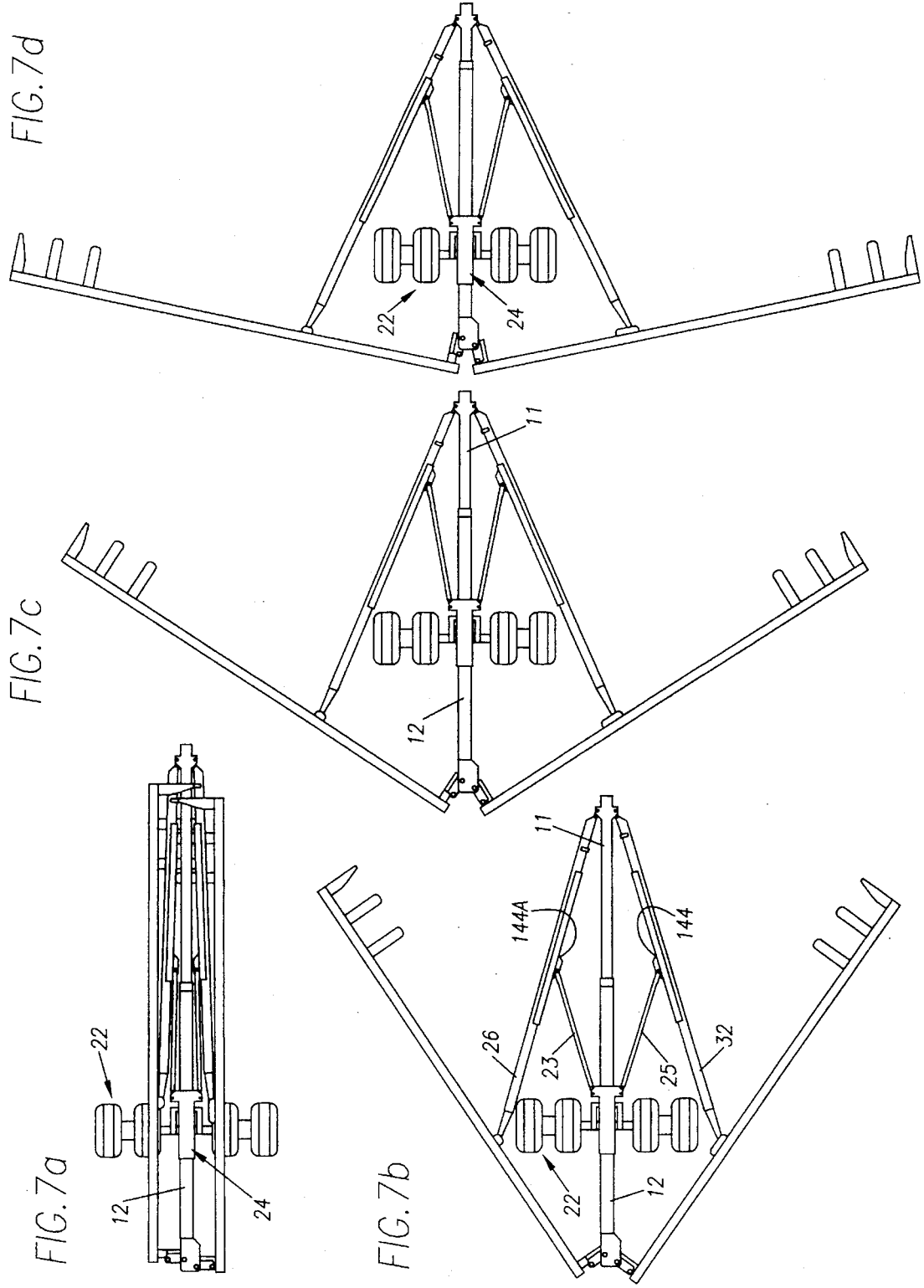

FORWARD-FOLDING, WINGED, IMPLEMENT FRAME

FIELD OF THE INVENTION

The present invention relates to agricultural implements, in general; and more particularly, it relates to an improved forward-fold planter.

BACKGROUND OF THE INVENTION

Although the present invention has application to forward-fold implements in general and to agricultural planters other than row crop planters (for example, it has application to grain drills), it will be discussed, for the most part, in connection with a row crop planter. Persons skilled in the art will readily appreciate that grain drills may be mounted on the planter frame in place of the row units, and that other ground-engaging tools, particularly cultivating tools, fertilizer applicators and tillage tools, may be substituted for the row units.

As agricultural planters became larger in width in the planting or field-use position, it became desirable to provide some mechanism to fold the planter for transport or storage. Many proposals have been provided for including, as a part of the main support frame for the implement, wing frames which hinge about their inner ends to swing or "fold" forwardly. That is, the outermost ends of the wing frames swing toward the tractor so that the wings, in the folded position, are parallel to each other and in the fore-to-aft direction. Some of these planter frames were provided with a fixed center section mounted to the main wheel set, and first and second wing sections mounted to hinge about the outboard ends of the center section, as in U.S. Pat. No. 4,137,852. In others, the wings extend to the center of the draft frame so that there is no fixed center sections, and the wings pivot about locations near the center of the longitudinal or draft frame, as in U.S. Pat. No. 4,319,643.

Subsequent improvements in forward-fold implement frames (sometimes called "carrier" frames) placed the pivot points for the wing sections at offset locations. That is, one pivot point was located forwardly relative to the other and closer to the centerline of the implement, so that the wing support wheels can be mounted in front of the wing frames in the field-use position; and, when the wings are folded, the wing support wheels interleave with one another due to the offset pivot arrangement. This reduces the transport width and is particularly useful for grain drills and the like, such as are disclosed in U.S. Pat. Nos. 4,763,915 and 5,024,279.

In these prior implement frames having forward-folding wing sections, when the wing sections are folded, the center of gravity of the wing sections is moved forwardly of the main wheel set normally located at the rear of the main, longitudinal frame. Moreover, most forward-fold wing sections provide some arrangement for securing the forward ends of the wing sections in the folded position to the main frame so that the forward ends of the wings, including all units carried by the wings, is supported by the main longitudinal frame. Both of these characteristics (that is, forward shifting of the center of gravity upon folding and supporting the forward ends of the wing sections on the center frame for transport), greatly increase the downward load on the tractor drawbar.

This drawbar loading problem is exacerbated as implements become larger and planters become wider.

SUMMARY OF THE INVENTION

The present invention is directed to an implement frame structure of the type discussed having a longitudinal center main frame which is extensible (in the illustrated embodiment it is telescopic), by means of an hydraulic cylinder unit. The longitudinal main frame includes a forward telescoping member adapted to be connected to the tractor drawbar, and a rear telescoping member. The extensible frame is retracted for the field position and extended for the transport position so that first and second wing sections, upon which individual planter row units are mounted, can be rotated or folded forwardly.

The main wheel set is mounted to the rear end of the rear telescoping member of the central main frame by means of a carriage capable of sliding along the rear frame member.

First and second fold links are connected at their forward ends to the forward telescoping member of the central main frame, and at their rear ends respectively to intermediate locations on the left and right wing frames so that when the central main frame is extended, the fold links, together with auxiliary hydraulic cylinder units, cause the wings to rotate forwardly to the folded position. Positioning links are mounted between the carriage of the main wheel set and the fold links. The forward ends of the positioning links are mounted to the fold links by means of a slide mechanism and arrangement such that after the wing sections are folded forwardly by a predetermined amount, the carriage and main wheel set are begun to be slid forwardly on the central main frame. In the fully folded position, the main wheel set is moved to its full forward position, thereby reducing the load on the tractor hitch.

During unfolding, the slide mechanism connecting the positioning links to the fold links permits the wing sections to begin to open (i.e., unfold) a predetermined amount, and thereafter the positioning links begin to urge the carriage and main wheel set rearwardly along the central main frame as it retracts, so that when the wing sections are fully unfolded, the wheel set is at its rear position and wheels of the central main wheel set are laterally aligned with the wing support wheels.

Thus, the present invention substantially reduces the downward force on the tractor drawbar during the transport position. The structure is suitable for accommodating planter widths of twenty feet or more and up to seventy-five feet or greater without undue load on the tractor hitch, yet all of the support wheels of the implement are in lateral alignment in the use position to facilitate field maneuvering of the implement and to eliminate scuffing of the wheels.

The hydraulic circuit for raising the implement frame includes one hydraulic cylinder unit for each wing support wheel on each of the wing sections, and two central hydraulic cylinder units connected between the main wheel set and the inboard ends of the wing sections. The central units are mechanically connected to operate in unison. All the wing section lift cylinder units are synchronized to lift the wing frame to a first height for field turning wherein the row units are disengaged from the ground. When it is desired to fold the implement for transport, the operator actuates a bypass and this permits the wing lift cylinders and the central cylinder to elevate the wings, still parallel to the ground, to a second, transport height, above the field turn height. The central lift cylinders, however, have a greater extension than the outboard lift cylinders; and after the outboard lift cylinders have reached their full extension, the central lift cylinders which are mounted on the main wheel set, continue to lift the inboard ends of the wing sections so that the wing sections assume a downwardly and outwardly inclined configuration. This lifts the row units mounted toward the center of the implement above the wheels on the main wheel set and facilitates folding of the wing sections without interference between the row units and the wheels of the main wheel set.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIG. 4a is a close up left side elevation view of the tower and hitch structure for mounting the forward end of the central main frame to a tractor;

FIGS. 6a–6d are diagrammatic plan views of the implement illustrating the sequence of positions of the wing sections during folding of the wing sections to the transport position;

FIGS. 7a–7d are diagrammatic plan views of the implement frame illustrating the sequence of positions of the wing sections during opening to the field use position;

DETAILED DESCRIPTION OF A PREFERRED EMBODIMENT

Figure 1:
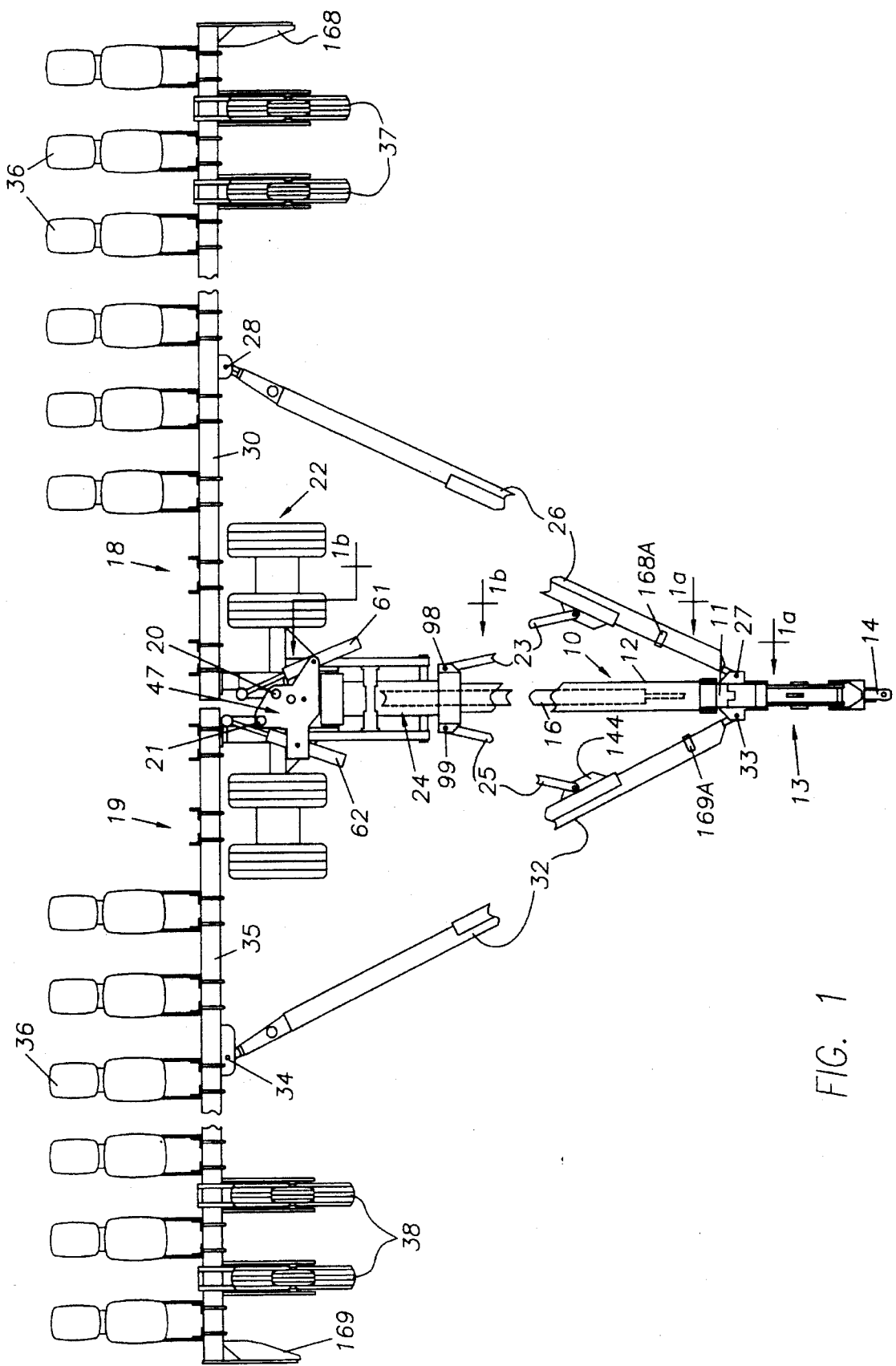
FIG. 1 is a vertical plan view of a forward-folding implement frame constructed according to the present invention, in the extended or field use position, with the center planter units removed for clarity, and with portions of the wing sections, central main frame and draft links broken away to foreshorten the implement.

Referring first to FIG. 1, the planter includes a longitudinal central main frame 10 in the form of a telescoping tongue having an inner, forward tubular member 11 and an outer, rear tubular member 12. A support structure, referred to as a "tower" and generally designated 13, is connected to the forward end of the inner tubular telescoping member 11. The tower 13, as will be further described below, includes a parallel linkage and hydraulic cylinder unit for connecting and raising the forward end of the central main frame to a hitch 14 adapted to connect to a tractor hitch, not shown.

A long hydraulic cylinder unit 16 (sometimes called the extension cylinder) has its barrel end connected to the rear end of the outer telescoping member 12, and its rod connected to the forward end of the inner telescoping member 11. Thus, when the hydraulic cylinder unit 16 is extended, the main frame 10 extends, and conversely, when hydraulic cylinder unit 16 is retracted, the main frame retracts.

Left and right wing sections generally designated 18 and 19 respectively are pivotally mounted to the rear of the central main frame for rotation in horizontal planes about pins 20, 21 respectively. As is conventional, the terms "left" and "right" refer to sides of the planter when looking in the direction of travel of the implement which, in FIG. 1, is downward in the plane of the page.

The rear end of the central main frame, as well as the innermost portions of the left and right wing sections 18, 19 are supported by a main wheel set generally designated 22 which is mounted by means of a carriage 24 for controlled, sliding motion along the rear portion of the outer tubular member 12 of the telescoping main frame, as will be described further below.

A brace or link 26 is pivotally connected at 27 to the inner, forward telescoping member 11 of the extensible central main frame, and it is pivotally connected at 28 to an intermediate location of the main tubular frame member 30 of the left wing section frame, which is broken away and foreshortened in FIG. 1. Similarly, a brace or link 32 has its forward end pivotally connected at 33 to the inner tubular member of the extensible main frame, and its rear end pivotally is connected at 34 to an intermediate location on the tubular frame member 35 of the frame of the right wing section 19. The links 26, 32 are referred to as "fold links", although they perform the function of bracing the wing sections in the field use position, as persons skilled in the art will understand.

The tubular frame members 30, 35 of the left and right wing sections are sometimes referred to as toolbars because the ground working tools, in this case individual planter units 36, are mounted to these frame members. The invention, as persons skilled in the art will readily appreciate, is not limited to the particular row units shown, nor even to row units in general. For example, grain drills, could be mounted to the toolbars 30, 35. Moreover, persons skilled in the art will appreciate that the implement frame of the illustrated embodiment may serve as a carrier frame for other tools such as cultivator sweeps, chisel plows, sprayers, or anhydrous ammonia applicators, if desired. These applications, as well as the manner in which the individual row units are constructed and mounted to the toolbars, are conventional and form no part of the present invention. However, the mounting of the wing support wheels in front of the tubular frame sections 30, 35 does leave the rear of those frames free for mounting tools at any desired spacing over a wide range without interference with support wheels or wheel arms.

In the illustrated embodiment, each wing section includes twelve individual planter row units 36; hence, the planter is a 24-row planter. The left wing section 18 is supported at its center by the main wheel set 22, and will be described presently, and at its outboard end by two wing support wheel assemblies 37, each including an associated hydraulic lift cylinder unit and linkage. Similarly, the outboard end of the right wing section 19 of the illustrated embodiment is supported by two wing support wheel assemblies 38 and lift cylinder units.

Figure 9:
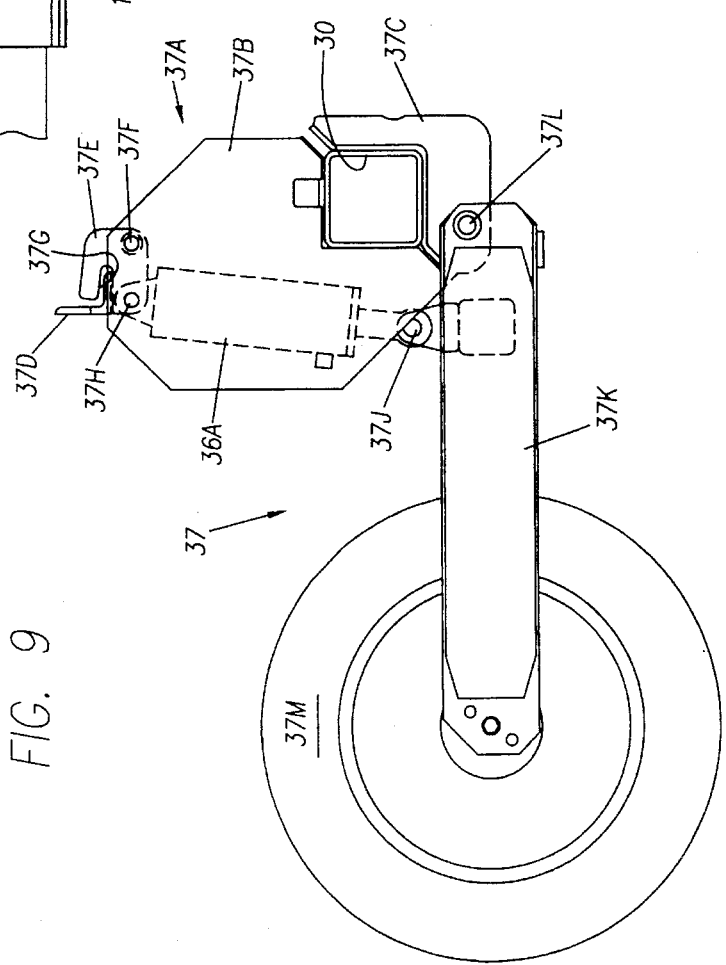
FIG. 9 is a left side elevation view of a wing wheel assembly.

Referring to FIG. 9, and typical wing support wheel assembly is shown, and will be described in reference to one of the left side wing support wheel assemblies 37. The right side wing support wheel assemblies are similar; and persons skilled in the art will appreciate that in the case of a planter, each of the wing wheel assemblies may further include a drive wheel in contact with the associated wing wheel for driving a conventional transmission which supplies power to the seed meters. The drive chain and transmission to the seed meters form no part of the present invention, however, and have been removed for clarity and will not be further described. Turning then to the wing wheel assembly 37 seen in FIG. 9, it includes a wheel tower generally designated 37A which includes two laterally spaced, vertical plates, one of which is designated 37B, and a lower angled clamping section 37C. The wheel tower 37B and clamping section 37C are conventionally mounted to the tubular frame member 30. At the upper portion of the wheel tower there is mounted an angle iron 37D, behind which is mounted a rocker plate 37E. The rocker plate is pivotally mounted at 37F, and it includes a slot 37G which fits over a lower, rearwardly-extending flange of the angle iron 37D. The angle iron limits the rocking motion of the plate 37E. A hydraulic cylinder unit and piston rod unit 36A is pivotally mounted at its barrel end to the rocker plate 37E at 37H, and at its rod end at 37J to a mounting bracket connected to a wheel arm 37K. One end of the wheel arm 37K is pivotally mounted at 37L to the angle mount 37C of the wheel tower; and the support wheel 37M is conventionally mounted to the forward end of the wheel arm 37K. The rocker bracket 37E is used in the case of a planter and permits the planter drive take-up wheel (not shown, but described above) to remain in contact with the ground support wheel 37M should the ground support wheel encounter minor irregularities in the ground. In operation, the ground support wheel 37M, which extends in front of the tubular frame member 30, serves as a base in which to raise the planter wing frame by extending the hydraulic cylinder unit 36A. If the hydraulic cylinder unit is retracted, the outboard end of the associated wing section is lowered.

Figure 2:
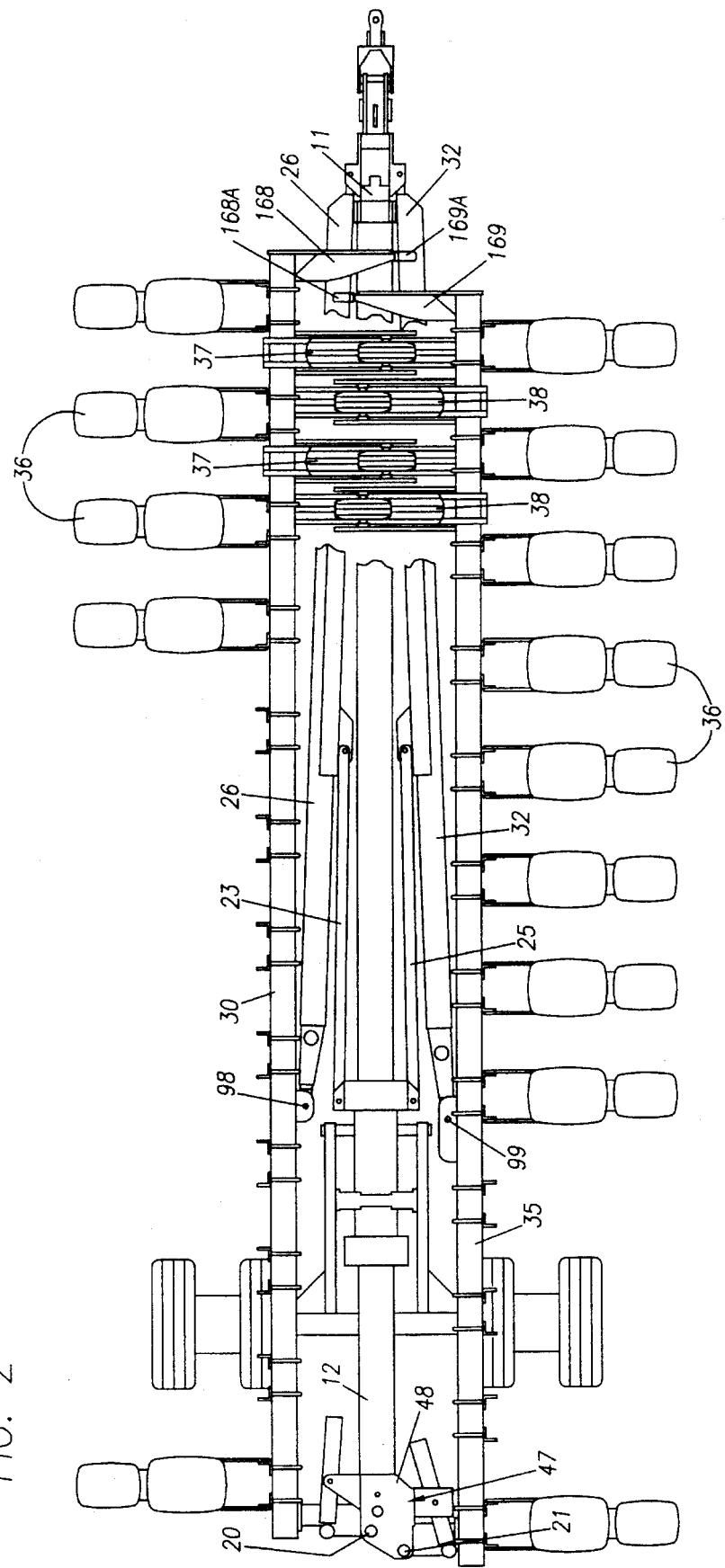
FIG. 2 is a vertical plan view of the implement of FIG. 1 in the folded or transport position, with some of the row units removed for clarity.
Figure 3:
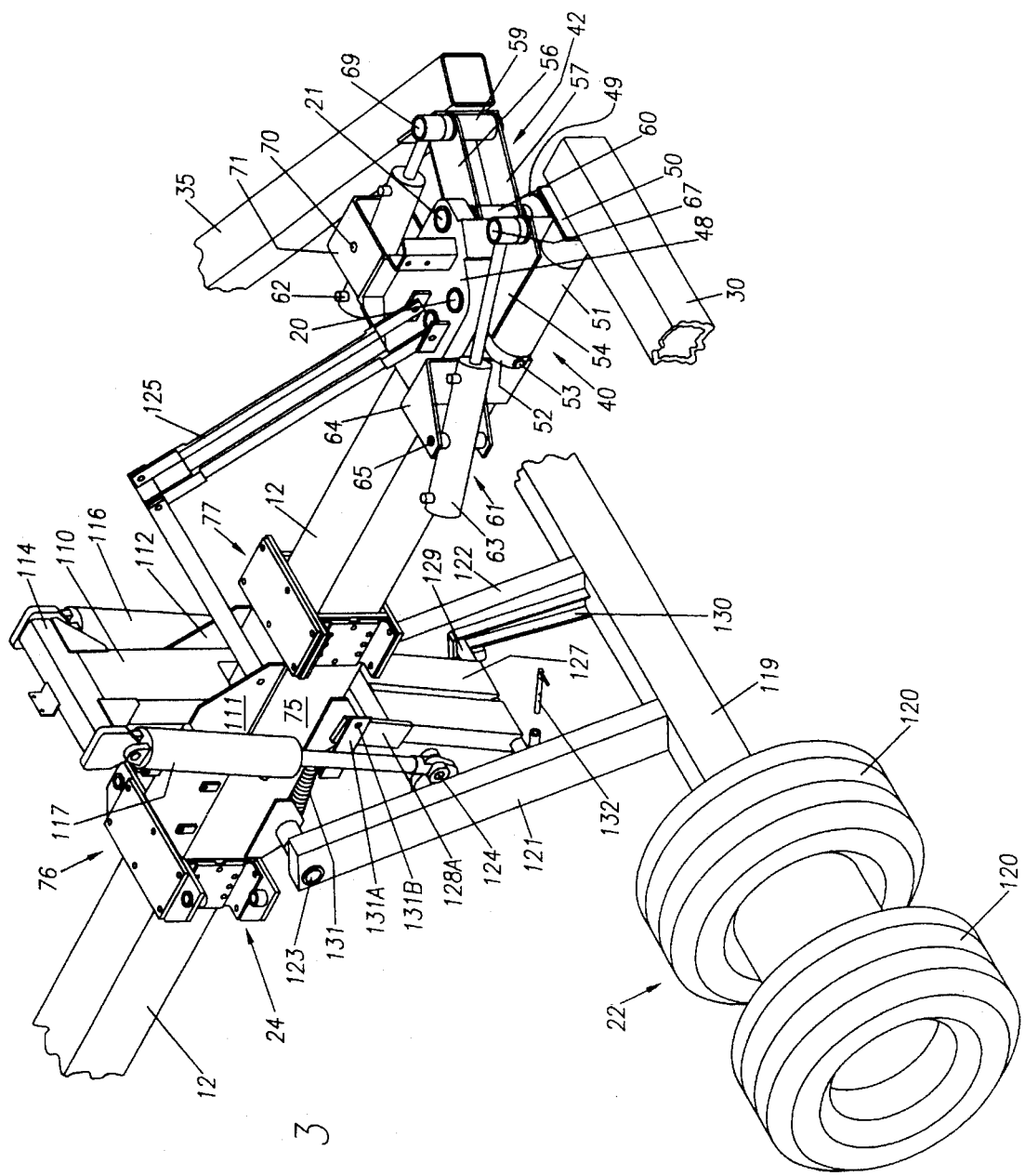
FIG. 3 is a fragmentary perspective view, taken from the upper, rear, left side of the implement, showing the carriage mounting the main wheel set to the central main frame and showing the auxiliary fold hydraulic cylinder units and main bearing mounts for the wing sections.

The left wing section pivots about a pin 20, and the right wing section pivots about a pin 21, as seen in FIGS. 2 and 3. The pin 20 is located forwardly of the pin 21, and closer to the center line of the telescoping main frame 10, which is the center line of the machine. In the field use position shown in FIG. 1, the inboard ends of the wing frames are adjacent, and the axes of the tubular frame member 30, 35 are aligned, as seen in FIG. 1. Moreover, the axes of rotation of the wing support wheels are aligned with the wheels of the main wheel set 22. This facilitates maneuvering of the planter in the field, and avoids scuffing of the wing support wheels which can become an operational problem, particularly in large planters.

In the folded position, however, as best seen in FIG. 2, the left wing frame 30 is positioned slightly forwardly of the right wing frame 35. This is due to the fact that the left wing pivot 20 is located forwardly of the right-wing pivot 21. This arrangement enables the support wheels of the left wing section to interleave with the support wheels of the right wing section in the folded position of FIG. 2 to reduce the overall width of the planter in transport.

Turning now to FIG. 3, the left wing tubular frame 30 is connected to the rear telescoping tube 12 by means of a fabricated structure referred to as a knuckle and generally designated 40. Similarly, the right wing tube 35 is connected to the tubular frame member 12 by means of a knuckle generally designated 42. Each of the knuckles 40, 42 is similar in structure, so that only one knuckle need be described for an understanding of its structure.

Knuckles 40, 42 are mounted to the rear of tube 12 by a main mounting assembly 47 (see FIGS. 1 and 2), which includes upper and lower plates 48, 49 welded respectively to the top and bottom walls of the rear telescoping tube 12. The plates are provided with aligned apertures forming journals for the previously described main pivots 20, 21 for the left and right wing sections respectively. A horizontal stub shaft (hidden from view) is mounted to the forward end of a plate 50 which is mounted to the forward surface of the left wing tube 30. This stub shaft is received in a metal sleeve 51 of knuckle 40; and its forward end is secured by a retainer sleeve 52 and bolt 53. The upper horizontal plate of the left knuckle 40 is designated 54 in FIG. 3. The upper and lower horizontal plates for the right knuckle 42 are designated respectively 56 and 57. These upper and lower plates are, in turn, secured together by tubular members 59, 60 in the form of a link; and the tubular sleeve 51 of the knuckle is welded to the upper and lower horizontal plates of the knuckle to form a unitary, rigid structure which receives the stub shaft of the plate 50, in the case of the left wing tube 30. Thus, the shaft of the wing tube may rotate freely in the sleeve 51 of the knuckle to permit the wing to flex vertically about a horizontal axis defined by the stub shaft. By a similar knuckle structure 42, the right wing frame 35 may flex vertically and independently of the left wing frame 30 to follow uneven ground contour.

The wing sections are assisted in their rotational folding motion by first and second assist or auxiliary hydraulic cylinder units 61, 62 for the left and right wings respectively. The barrel end 63 of the left fold assist cylinder unit 61 is mounted at an intermediate location to a trunnion bracket 64, which, in turn, is mounted to the main rear mounting assembly 47, FIG. 2. The barrel end 63 pivots about a pin 65 mounted to the bracket 64 so that the assist cylinder unit 61 may rotate about a vertical axis as the left wing frame pivots about pin 20. The rod end of the hydraulic cylinder unit 61 is pivotally mounted at 67 to the rear of the left knuckle 40. This arrangement can better be seen for the right wing assist cylinder unit 62 which has its rod end mounted by means of a pin 69 to the knuckle 42 for pivotal motion, the pin 69 being received in the rear sleeve 59 of the knuckle 42. An intermediate location of the barrel of the right assist cylinder unit is pivotally mounted at 70 to a trunnion bracket 71 which is also mounted to the upper plate 48 of the main mounting structure.

As discussed above, both the tongue extension hydraulic cylinder unit 16 (acting through the fold links 26, 32) and the fold assist hydraulic cylinder 61, 62 (acting through the knuckles 40, 42) cooperate to open the wing sections for field use and to fold the wing sections for transport. By comparing FIGS. 1 and 2, it can be seen that the extension hydraulic cylinder has maximum leverage (i.e., greatest moment arm) in the field position (FIG. 1) and minimum leverage in the folded position (FIG. 2), whereas the fold assist cylinder units have maximum leverage in the folded position and minimum leverage in the field position. Thus, these two systems supplement each other and cooperate to provide sufficient power to fold and unfold the wing sections in all folding positions.

Figure 1B:
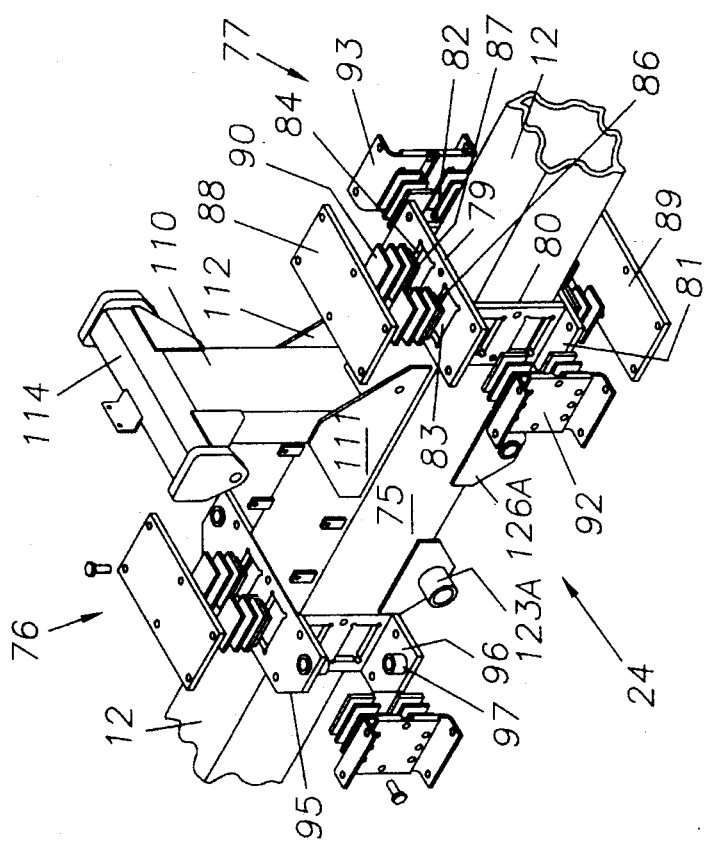
FIG. 1b is a fragmentary perspective view, taken from the upper, rear, left side of the sliding carriage which mounts the main wheel set to the rear telescoping member of the central main frame, together with forward and rear wear plate and retainer assemblies in exploded relation for reducing friction between the telescoping members.
Figure 5:
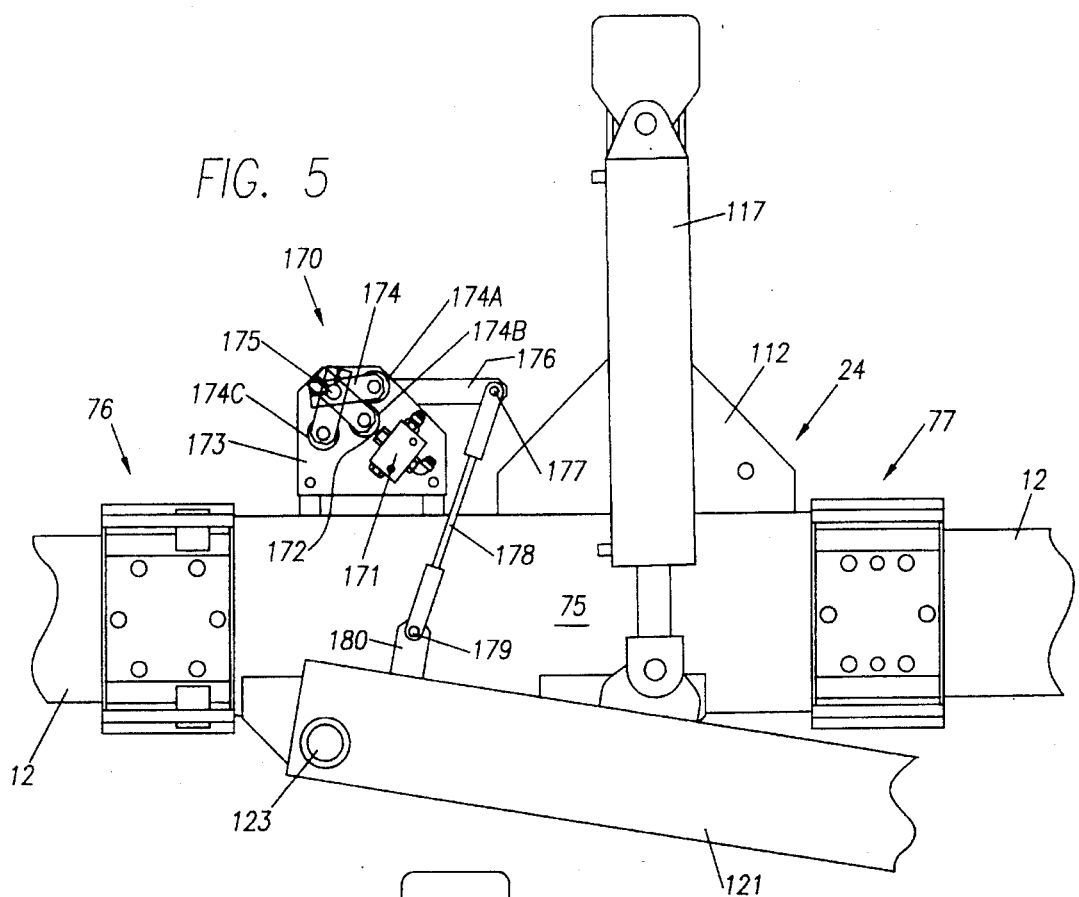
FIG. 5 is a fragmentary left side view of the carriage for the main wheel set and the left side central hydraulic lift cylinder unit, together with the hydraulic field turn limit valve which defines the height of the wing sections in the field turn position.

Referring to FIGS. 1, 3 and 5, the carriage 24 includes a tubular sleeve 75 received on the outside of the outer telescoping tube 12. Left and right positioning links 23, 25, are connected, in a manner to be described, respectively between the left fold link 26 and the right fold link 32 and the forward end of the carriage 24. The tubular sleeve 75 is adapted to slide along the outer surface of the outer telescoping tube 12 by means of forward and rear retainer and wear plate assemblies 76, 77 which include bearing or wear plates for reducing friction and facilitating the sliding motion of the carriage along the tube 12. FIG. 1b shows the forward and rear retainer and wear plate assemblies 76, 77 in exploded relation. These assemblies are similar in structure in function so that only one need be described in detail for an understanding of the assembly. However, the forward assembly is different in that it includes bushings for receiving the pivot pins at the rear ends of the left and right positioning links 23, 25 respectively.

Referring then to the rear retainer assembly 77 as seen in FIG. 1b, it includes four mounting plates 79, 80, 81 and 82, mounted respectively to the top, left side, bottom and right side of the tubular sleeve 75 of the carriage 24. Each of the plates 79–82, as can be seen from the plate 79, has a pair of rectangular cut outs, 83, 84. These cut out portions are aligned with corresponding apertures in the sleeve 75, and they are sized to receive respectively wear strips or pads 86, 87. The wear strips 86, 87 are made of bronze for increased wear and reduced friction; and they are held in place by a top retainer plate 88 which is bolted to the top mounting plate 79. The wear strips could be other materials, including plastics, such as Nylatron®. Spacer members such as that designated 90 in FIG. 1b are added, as needed, to achieve the proper spacing of the sleeve 75 of the carriage 24 from the outer telescoping tube 12. A bottom retainer plate 89 similar to the retainer plate 88 is also provided; and left and right U-shaped retainers 92, 93, secure the side wear strips and have their upper and lower flanges bolted respectively to the top and bottom retainer plates 88, 89.

The primary difference between the forward retainer assembly 76 and the rear retainer assembly 77, just described, is that the upper and lower mounting plates, 95, 96 of the forward retainer assembly are extended laterally beyond the side retainer plates to form tabs which are provided with upper and lower bushings, such as the one designated 97 for the left side of the lower mounting plate 96, for receiving pivot pins for mounting the rear ends of the carriage positioning links 23, 25 respectively. These pins are designated 98, 99 in FIG. 1.

Figure 1A:
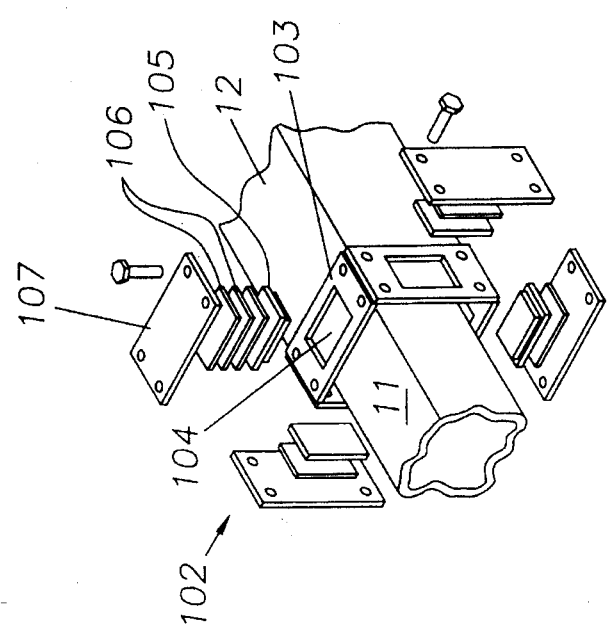
FIG. 1a is a fragmentary perspective view, taken from the upper, frontal, left side of the implement, showing the wear plate and retainer assembly which couples the telescoping members of the central main frame of the implement, with components in exploded relation.

The forward end of the rear telescoping tube 12 is similarly provided with a retainer and wear strip assembly generally designated 102 in FIG. 1a for slidably receiving the inner telescoping tube 11. In this case, however, each of the four mounting plates is provided with a single cut out so that only one wear plate is provided for each surface of the inner telescoping tube 11; and all of the mounting plates are mounted directly to the corresponding outer surface of the outer telescoping tube 12. The retainer plates are mounted directly to the associated mounting plates. Specifically, an upper mounting plate 103 is provided with a central cut out 104 which receives a wear strip 105. The lower surface of the wear strip 105 is in engagement with the upper surface of the inner telescoping tube 11; and the wear strip 105 is backed by spacers 106, as needed. The outer retainer plate is designated 107 in FIG. 1a for the top wear strip 105.

Referring now to both FIGS. 1b and 3, a vertical pedestal 110 is mounted to the top of the sleeve 75 of the carriage, braced by gusset plates 111 and 112. At the top of the pedestal 110 is a cross bar 114 to which the barrel ends of central hydraulic cylinder units 116, 117 are mounted, as seen in FIG. 3. The central cylinders 116, 117 raise the rear end of the telescoping main frame as well as the inboard ends of the wing frames by rotating the main wheel set relative to the frame, as will now be described.

The main wheel set 22 includes a horizontal axle assembly generally designated 119 to which four wheels 120 are conventionally mounted. At the center of the axle assembly 119 two struts 121, 122 are mounted; and the upper ends of the struts 121, 122 are pivotally mounted to the tubular sleeve 75 of the carriage. The pivot pin for the strut 121 being designated 123 in FIG. 3, and the sleeve for the pin is seen at 123A in FIG. 1b. The rod end of hydraulic cylinder unit 117 is pivotally mounted at 124 to the strut 121; and the rod end of the hydraulic cylinder unit 116 is similarly mounted to the strut 122. When the hydraulic cylinder units 116, 117 are extended, they are thus constrained to act in unison to raise the tubular sleeve 75, and thus the entire rear end of the telescoping main frame by rotating the struts 121, 122 clockwise about the pivot 123 (when viewed from the left side). It is an important feature of the present invention that the central lift cylinders 116, 117 have their barrel ends mounted together (by means of the cross bar 114) so that they act in unison in raising the rear end of the telescoping main frame. This is so because each central lift cylinder unit is connected in a master/slave relation with the associated wing lift cylinder units on the same side of the frame.

An articulated hose guide generally designated 125 is connected between mounting plate 48 at the main pivot mounting assembly for the wings, and the upper gusset plates 111, 112 of the tubular sleeve 75 of the carriage 24. As the carriage slides rearwardly on the outer tubular member 12 of the telescoping main frame, the center of the articulated hose guide raises, and as the carriage 24 slides forwardly of the rear end of the central main frame, the hose guide 125 flattens out, protecting the hydraulic hoses coupled to the wings in all relative positions of the carriage 24.

Figure 10:
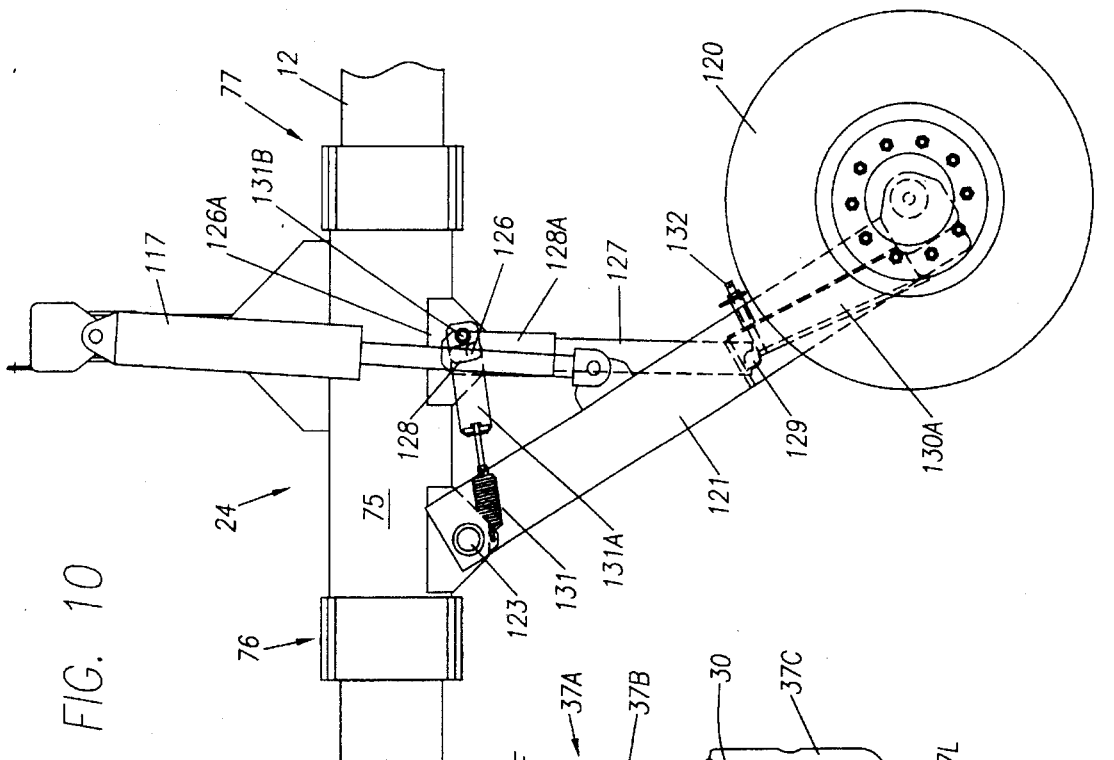
FIG. 10 is a left side close-up view of the safety latch and post mechanism.

Referring to FIGS. 3 and 10, a safety post 127 formed of two rectangular tubular members is mounted beneath the tubular sleeve 75 of the carriage 24 by means of a shaft seen in phantom at 126 in FIG. 10. A second shaft 129 located at the bottom of the safety post 127 rides in tracks 130, 130A located respectively on the inner surfaces of the struts 121, 122.

Shaft 126 extends beneath the carriage 24 and is journalled in mounting brackets 126A (see FIGS. 5, 5a and 10), mounted to the sides of and extending below, the sleeve 75 of carriage 24. The outboard ends of the shaft 126 are also received in a pair of slots, one of which is designated 128 in FIG. 10, formed in extension brackets, one of which is designated 128A in FIG. 10, mounted to the sides of the safety post 127 and extending upwardly of the safety post.

The slots 128 extend upwardly and slightly forwardly, permitting the safety post to move upwardly and downwardly relative to the carriage, for reasons to be described below.

A reset spring 131 is secured at its forward end to a bracket extending beneath the carriage 24, and at its rear end to reset bracket 131A which is pivotally attached at 131B to the extension bracket 128A just to the rear of the slot 128 in the extension bracket 128A.

The spring 131 and reset bracket 131A bias the safety post 127 to rotate in a counterclockwise direction in FIG. 10 when the bolt 131B which connects the reset bracket 131A to the extension bracket 128A on the safety post, is above the location of the shaft 126 in the slot 128; and conversely, the spring 131 causes the safety post to rotate in a clockwise direction when the pivot 131B is located beneath the shaft 126.

In operation, when the frame is in the field use position, the shaft 129 is in the lower portion of the tracks 130, 130A, and the shaft 126 is at the top of slot 128 because the safety post is free to lower itself in the track under gravity. The shaft 128 is above the pivot 131B, so the reset spring 131 urges the safety post counterclockwise—that is, the lower portion of the safety post (including shaft 129) is urged forwardly in the tracks. When the frame is raised to the transport position, the shaft 126 is still at the top of the slot 128 because it is the shaft 126 which lifts the safety post. At the full extension of the central lift cylinders, the lower portion of the safety post 127 slides forwardly, seating the outboard ends of the lower shaft 129 in their associated recesses at the upper, forward portions of slots 130, 130A. When hydraulic power is shut off, the post 127 remains locked in the position shown in FIG. 10. At this time, a pin such as that designated 132 in FIGS. 3 and 10 may be inserted in the track to hold the safety post in the latched position.

After the lift cylinders are relaxed, the shaft 126 moves downwardly in the slot 128, thereby placing the pivot 131B above the shaft 126 (as seen in FIG. 10), and reversing the bias on the safety post 127. When it is desired to place the planter frame in the field use position, the central cylinders (and the wing cylinders) are first extended slightly, but not to their full extension. This causes a slight lifting of the safety post 127, due, in part, to the inclination of the slot 128, and when the lower shaft 129 is free of the recesses in tracks 130, 130A, the lower portion of safety post 127 rotates rearwardly, so that the cylinders may be retracted, and the safety post will slide in the tracks 130, 130A to permit the frame to be lowered.

Figure 4:
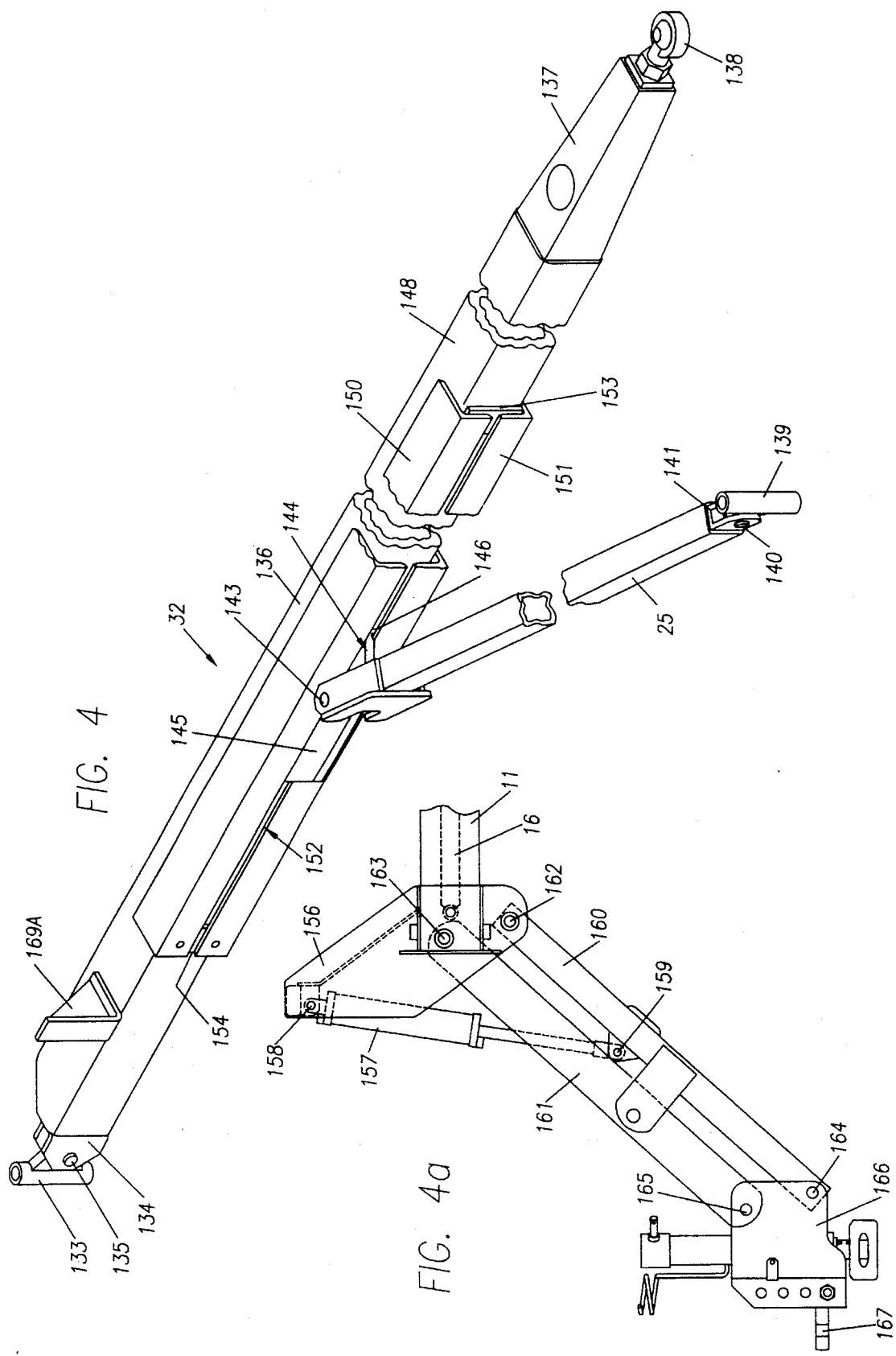
FIG. 4 is an upper, rear, right-side perspective view of the wing link and positioning link for the right wing section of the implement of FIG. 1, with both links broken away and foreshortened.

Turning now to FIG. 4, the right side fold link 32 and positioning link 25 are shown in greater detail. The forward end of the fold link is provided with a bushing 133 mounted to a clevis 134 by means of a fixed pin 135. This arrangement permits the fold link 32 to pivot about vertical and horizontal axes at its forward pivot connection 33 (FIG. 1) to the inner telescoping tubular member 11 of the central main frame. The main portion of the fold link 32 is a tubular member 136, the rear end of which is welded to a tapered section 137. The rear end of the tapered section 137 is provided with a ball joint 138 which receives the pin 34 connecting the rear end of the fold link 32 to the forward surface of the wing frame tube 35.

The rear end of the positioning link 25 is provided with a bushing 139 which is connected by means of a pin 140 to a clevis mount 141 at the rear of the link 25. The bushing 139 receives the pin 99 seen in FIG. 1 at the forward right corner of the carriage 24. The forward end of the positioning link 25 is pivotally mounted at 143 to a slide 144 member which rides in a track 152. The slide member 144, in cross section is in the form of a "T" having a base 145 and a cross bar 146 which is captured between the adjacent upright side wall 148 of the tubular section 136 of the folding link 32, and upper and lower angles 150, 151 which are welded respectively to the upper and lower surfaces of the tubular section 136 but have their vertical flanges spaced therefrom to receive the cross member 146 of the slide 144. That is, the adjacent edges of the angles 150, 151 are spaced to define a slot or track 152 in which the base 145 of the slide member 144 moves.

At the rear of the track 152 there is welded a stop member 153. A similar stop or limit member 154 is secured to the angles 150, 151, by bolts received in holes tapped in the upright wall 148 of the tubular section 136 to limit the forward motion of the slide member 144 for reasons to be discussed below. It is thus clear that the slide 144 is free to move in the track on the wing link 32 formed by the tubular section 136 and the upper and lower angle members 150, 151. The limits of movement are defined by the rear stop 153 and forward stop 154. The left side positioning link 23 is constructed similar to that of the right wing link 32, but in mirror image; and its connection to the left side wing link 32 by means of a slide mechanism with position limits, and to the left front side of the carriage 24 by mean of the pivot 98 is similar to that already disclosed for the right side links and will be understood by persons skilled in the art.

Turning now to FIG. 4a, the forward ends of the inner telescoping tube 11 is provided with a pair of upright side plates, one of which is seen in FIG. 4a and designated 156. A hydraulic cylinder unit 157 has its barrel end pivotally connected at 158 to the plates 156; and its rod end is pivotally connected at 159 to an intermediate location of a lower link 160 which is parallel to an upper link 161. The upper portions of the links 160, 161 are pivotally connected at 162, 163 respectively to side plates 156 at the forward end of the inner telescoping tubular member 11. The lower ends of the links 160, 161 are pivotally connected at 164, 165 respectively to forward hitch plates, one of which is seen at 166 in FIG. 4a. A conventional tractor hitch 167 is bolted to the plates 166. It will be understood that by extending the cylinder 157, the forward of the telescoping main frame may be raised; and the parallel links 160, 161, together with the cylinder 157, are designed so that when the rear end of the telescoping frame is raised for transport, the forward end is raised correspondingly to maintain the telescoping main frame in a generally horizontal position.

As seen in FIG. 1, wing latch members 168, 169, each in the form of a downwardly opening hook or latch opening, are mounted respectively at the ends of the left wing frame member 30 and the right wing frame member 35. Stop members 168A, 169A are mounted to the top, inner portion of the wing links 26, 32 respectively. Each of the stop members is in the form of an angle member with a brace, as seen for the stop 169A of the fold link 32 in FIG. 4. The stop 169A is mounted on the wing brace 32 so as to engage and stop the nose of the left side latch 168, and the stop 168A, on the other hand, is positioned on the fold link 26 to engage and stop the right-hand latch member 169 in the folded position, as seen in FIG. 2.

Turning now to FIG. 5, reference numeral 170 generally designates a cam-operated hydraulic shut-off valve referred to as the field-turn-height limit valve. The valve body is mounted on top of the tubular sleeve 75 of the carriage 24, forward of the lift cylinder 117. The apparatus includes a mechanically-controlled shut-off valve 171 having a plunger 172. The valve 171 is mounted to a support bracket 173, which also supports a cam arm 174 which is mounted to a pivot shaft 175 journalled in the plate 173. A crank arm 176 is mounted to the shaft 175 on the far side of plate 173 and extends rearwardly where is pivotally mounted at 177 to a link 178, the lower end of which is pivotally mounted at 179 to an upwardly extending tab 180 mounted on the strut 121 of the axle assembly 119.

As seen in FIG. 5 (which shows the apparatus viewed from the left-hand side), the main frame of the planter is lowered, and the central lift cylinder 117 is retracted. As will be described more fully below, when the hydraulic lift cylinders (including the cylinder 117) are extended to raise the central main frame and the wing frames, the strut 121 is rotated counterclockwise as viewed in FIG. 5, about the shaft 123. This pulls the link 178 downwardly and rotates the crank arm 176 in clockwise direction, moving the cam arm from the upper position shown at 174 to an intermediate position 174B so that a roller 174A mounted on the distal end of the cam arm 174, engages the plunger 172 of the hydraulic valve 171, and depresses it. As will be described more fully below, this causes the valve 170 to shut off, and it stops the flow of oil to the hydraulic lift cylinders. The arrangement of the linkage and cam as well as the position of the valve body 171 are such that the cam arm is in the position shown at 174B to actuate the plunger 172 of the valve 171 when the central main frame and the wings are at the field turn height position. When the planter is raised beyond the field turn position to the transport position, the cam arm 174 rotates beyond the plunger 172 to the position shown at 174c so that the cam roller 174a disengages the plunger 172. Although the cam arm rotates counterclockwise from the position shown at 174C to the field use position shown at 174, thereby passing through the intermediate position 174B at which the plunger 172 is depressed, the hydraulic circuit is such that during the lowering cycle, the hydraulic valve 171 passes hydraulic oil freely.

Figure 5A:
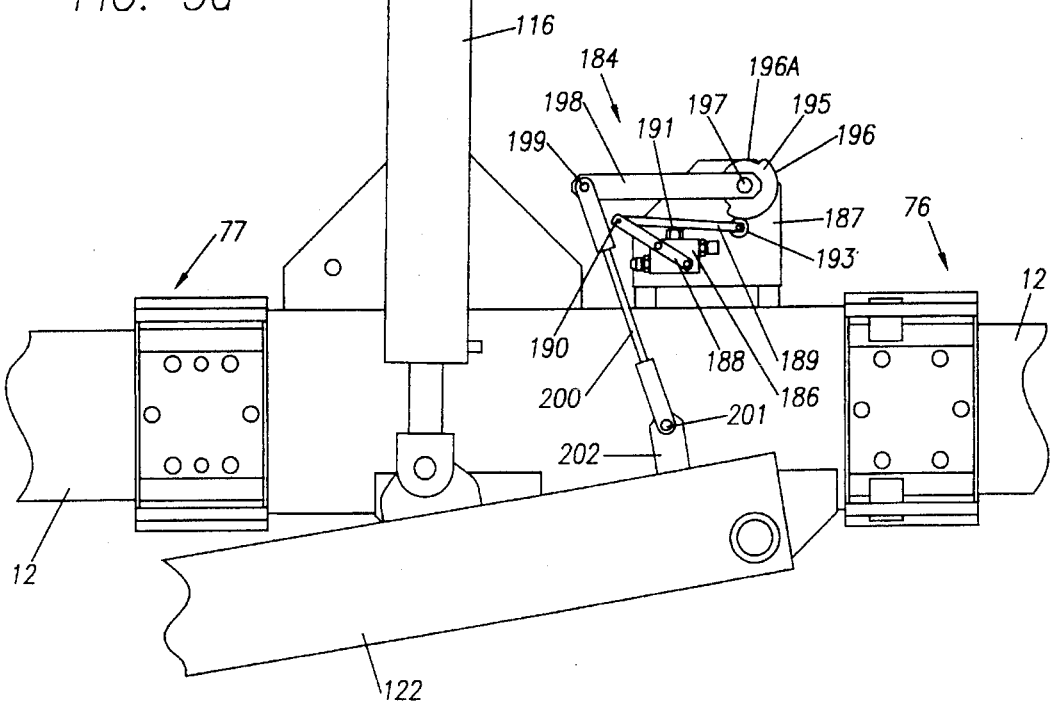
FIG. 5a is a right side view of the carriage and right sides of central lift cylinder unit showing the lowering control valve of the hydraulic circuit.

Turning now to FIG. 5a, reference numeral 184 generally designates a lowering control valve which is also mounted on the tubular sleeve 75 of the carriage 24. The apparatus includes a mechanical override check valve 186 mounted on a plate 187 which is mounted to the top of the sleeve 75, forward of the lift cylinder 116. An arm 188 is fixed to the body of the valve 186; and a cam arm 189 is pivotally mounted at 190 to the distal end of the fixed arm 188. The cam arm 189 extends forwardly and directly above a plunger 191 of the valve 186. The distal end of the arm 189 includes a cam follower 193 which engages a cam 195 rotatably mounted to the plate 187.

The cam 195 has an outer, actuating surface 196, and a second surface 196A of reduced radius. In the position shown, the cam follower 193 engages the actuating surface 196 and depresses the plunger 191.

The cam 195 is mounted to a shaft 197 which is fixed to an arm 198. The distal rear end of the arm 198 is pivotally mounted at 199 to a link 200, the other end of which is pivotally mounted at 201 to a tab 202 fixed to the top of the strut 122 of the axle assembly.

The arrangement of the lowering control valve is such that during raising of the planter, oil under pressure flows freely through the valve 186 irrespective of whether the plunger 191 is depressed or not. However, during lowering, at the initial stages of which the lift cylinder 116 is fully extended, the strut 122 is located counterclockwise relative to the position shown in FIG. 5a, and the cam 195 is also rotated counterclockwise such that the cam follower 187 rides on the non-actuated surface 196A and the plunger 199 of the valve 186 is not actuated, the valve 186 is shut off. During this initial lowering stage, for reasons explained below, the central cylinders 116, 117 retract, but the wing cylinders do not. When the central lift cylinders 116, 117 retract to a position where the wing frames are level (as shown in FIG. 8c), the actuating surface 196 of the cam 195 engages the follower 187 and the arm 189 depresses the plunger 191 to open the valve 186. This action enables all cylinders to lower the wing sections in unison.

Folding Operation

Figure 11:
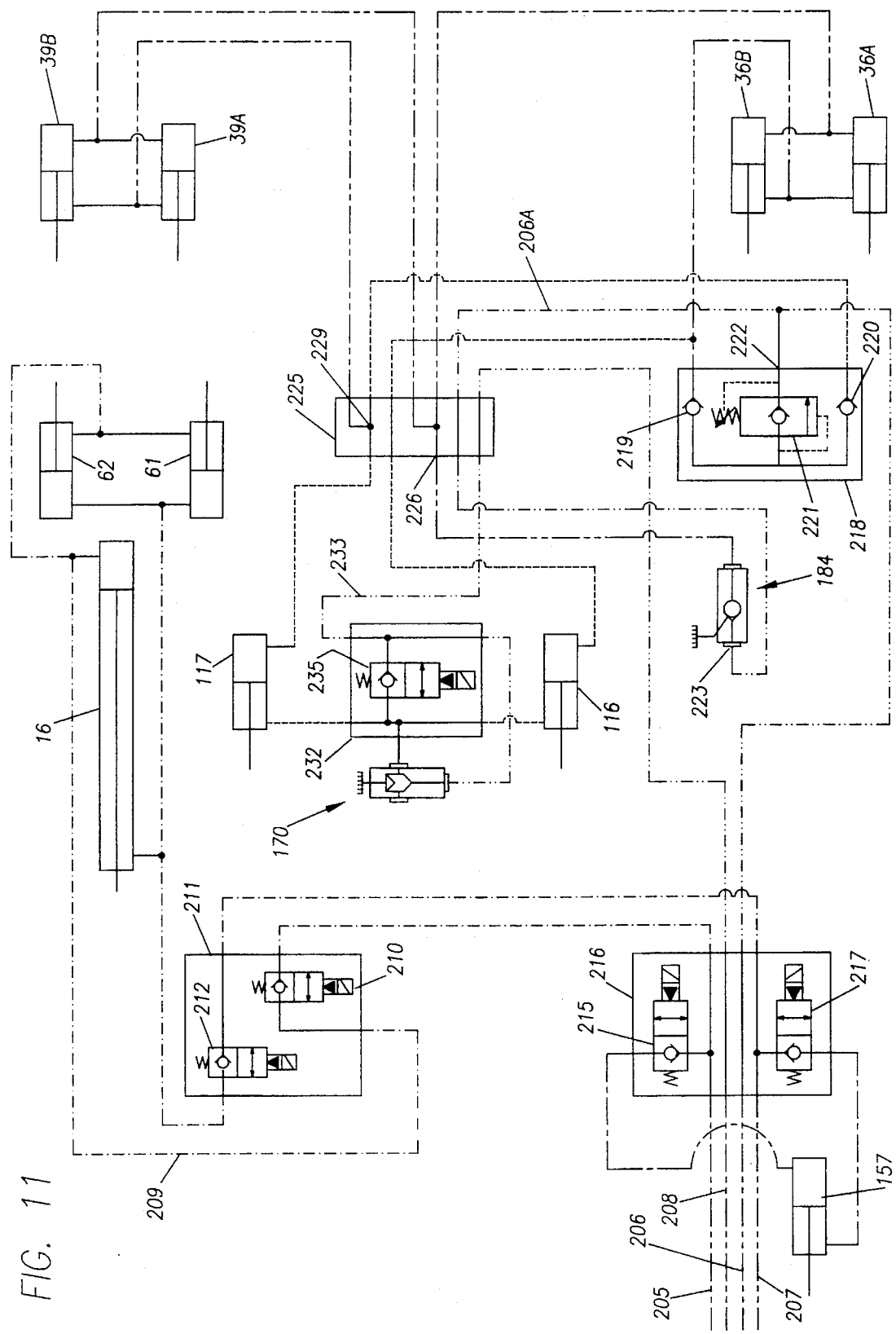
FIG. 11 is a schematic diagram of the hydraulic circuit for operating the lift cylinder units and the fold cylinder units.

Referring now to FIGS. 6a–6d and the hydraulic schematic diagram of FIG. 11, the operation of the implement frame from the field use position of FIG. 6a to the fully folded position (FIG. 2 and FIG. 7a) will be described. Hydraulic components shown schematically in FIG. 11 may bear the same reference numerals as the component previously described. Thus, referring to the upper central portion of the diagram, the extension hydraulic cylinder unit 16 arranged in the telescoping main frame or tongue 10 and the left and right fold assist hydraulic cylinder units 61, 62 are labelled with corresponding reference numerals. FIG. 11 includes two separate hydraulic circuits, both receiving pressurized hydraulic fluid from the hydraulic system of the tractor and returning fluid to the tractor. The two input pressure lines are designated 205 and 206 respectively and the corresponding return lines are designated 207 and 208 respectively. It will be understood that the fluid flow (and thus the pressure) may be reversed under operator control.

The hydraulic cylinder unit 16 for the telescoping main frame as well as the fold assist hydraulic cylinder units 61, 62 are connected in the hydraulic circuit comprising input pressure line 205 and return line 207. The rod ends of the fold assist cylinders 61, 62 are hydraulically coupled to the barrel end of the main frame extension cylinder 16, and this junction is connected by means of a hydraulic line 209 to a first solenoid-actuated hydraulic check valve 210 in manifold block 211. The other port of the valve 210 is coupled to pressure line 205. The barrel ends of the fold assist cylinders 61, 62 are coupled to the rod end of the extension cylinder 16; and that junction is coupled to a second solenoid-actuated check valve 212 in block 211, the other port of valve 212 being connected to return line 207.

When the operator elects to fold the machine, he actuates a hydraulic lever to pressurize input line 205; and he actuates an electrical switch to energize both solenoid valves 210, 212 to the open state. Pressurized fluid flows through the valve 210 to the barrel end of the long extension cylinder 16 to extend the telescoping members 11, 12 of the central main frame. While the central main frame is extending, the operator may drive the tractor slowly forward to facilitate extension. At the same time, hydraulic fluid is fed into the rod ends of the fold assist cylinder 61, 62 to retract them and thereby to help turn the wing frames 30, 35 about their respective rear pivots 20, 21.

By comparing FIG. 6b with FIG. 6a, it can be seen that as the central main frame extends (i.e., the inner telescoping tubular member 11 moves forwardly out of the rear telescoping member 12), the fold links 26, 32 retract to rotate the wing sections 18, 19 about their respective rear pivots 20, 21 because the rear ends of the fold links 26, 32 are connected to intermediate locations on the tubular wing frame members 30, 35, whereas the pivots 20, 21 are mounted to the rear of the outer telescoping member 12.

It will be observed from FIG. 6a that in the field use position, the slide members 144a, 144 mounted to the forward ends of the positioning links 23, 25 are located at the forward limits of their respective tracks. As the wing sections begin to fold forwardly, assisted by the action of the fold assist cylinders, of course, the slides of the positioning links 23, 25 slide rearwardly in their respective tracks until the tubular wing frame members 30, 35 are rotated forwardly relative to the use position to an angle of approximately 30°, as seen in FIG. 6c. At this time, the slide members 144a and 144 of the positioning link 23, 25 engage the rear limits of their associated tracks, represented by the stop member 153 in FIG. 4 for the slide member 144. As the central main frame extension cylinder 16 continues to extend, assisted by the cylinders 61, 62 and the inner telescoping member 11 continues its extension, the wing sections continue to fold, as seen in FIG. 6d; and the carriage 24 and main wheel set 22 are also moved forwardly along the rear telescoping member 12, as can be seen by comparing the position of the carriage 24 in FIGS. 6d and 6c. As the folding continues, the wing sections continue to close, and the carriage 24 and main wheel set 22 are pulled forwardly by the positioning links 23, 25 until the frame is placed in the position of FIGS. 7a and 2.

As best seen in FIG. 2, in the fully folded position, the latch members 168 and 169 engage the respective stop members 169A, 168A located on the fold links 32, 26 respectively. In the folded position, the downwardly opening hook of the latch members overlie the forward telescoping member 11 of the extensible central main frame so that when the forward portion of the main frame (i.e., the tower 13) is raised by hydraulic cylinder unit 157 (FIG. 4a), the central main frame will also raise the outboard (i.e., forward, in the folded position) ends of the wing sections by lifting the latch members, and thus the forward portions of the folded wing sections, upwardly. This raises the wing support wheels 37, 38 off the ground.

Returning to FIG. 11, the hydraulic cylinder unit 57 located in the tower section at the forward end of the extensible central main frame is seen in the lower left-hand corner of the diagram. Input pressure line 205 is connected to one inlet of a solenoid-actuated check valve 215 located in block 216, and the other port is coupled directly to the barrel end of the hydraulic cylinder unit 57. The rod end of the hydraulic cylinder unit 157 is connected to an input of another solenoid-actuated hydraulic check valve 217 located in block 216. The other port of the solenoid valve 217 is connected to return line 207.

Before raising the forward end of the central main frame by means of the central hydraulic cylinder unit 157, the operator will have energized the hydraulic circuit comprising pressure line 205 and return line 207 in order to fold the planter to the position of FIG. 7a. During the fold operation, the solenoid-actuated check valves 210, 211 will have been electrically enabled. They are connected in parallel electrical circuit so that a single signal enables both valves. However, a different electrical signal enables the valve 215, 217, which are also connected in parallel circuit with each other; and the operator will not have energized these latter valves until the folding sequence is completed. At that time, the operator actuates an electrical switch to energize the valves 215, 217 and this permits hydraulic fluid under pressure to flow from the pressure line 205 through valve 215 and into the barrel end of the hydraulic cylinder unit 157. Fluid is returned from the rod end of the hydraulic cylinder unit 157 through the valve 217 to return line 207. This raises the forward end of the planter frame and prepares the planter for transport.

Planter Unfold Operation

Turning now to FIGS. 7a–7d as well as FIG. 11, the planter is unfolded from the transport position by first lowering the forward portion of the central main frame. This is done by having the operator actuate a lever to pressurize line 207 in FIG. 11, line 205 acting as the return line, and by electrically actuating the valves 215, 217. Hydraulic fluid is then sent through the valve 217 to retract the cylinder 157 as persons skilled in the art will understand.

Next, the operator actuates an electrical switch in the tractor to actuate valve 210, 212 in block 211. This causes hydraulic fluid under pressure to pass through the valve 212 to retract the extension cylinder 16, and to extend the fold assist cylinders 61, 62 to unfold the wings.

As the wings begin to unfold the slide members 144a and 144 are located at the rear limits of their associated tracks on the left and right fold links 26, 35; and the main wheel set 22 and carriage 24 are located in their forwardmost position on the rear telescoping member 12 (FIG. 7a and FIG. 2). As the wings begin to unfold (under power of the retracting extension cylinder 16 and the fold assist cylinders, as described above), the fold links 26, 35 push the wings outwardly and the assist cylinders cause them to rotate about their respective pivots. As the wings unfold initially, the slide members slide forwardly in their respective tracks on the fold wings but the main wheel set 22 does not move initially.

When the unfolding wings reach the position seen in FIG. 7c, the slide members 144a and 144 reach the forward limits of their respective tracks on the fold links, and thereafter, the retraction of the forward telescoping member 11 into the rear telescoping member 12 places a rearward force on the carriage 24 through the positioning links 23, 25, to move the carriage 24 and main wheel set 24 rearwardly as the wings unfold (compare FIGS. 7c and 7d), until the wings are fully unfolded and laterally aligned in the field use position of FIG. 6a, and the carriage 24 and main wheel set are returned to their rearmost, field operating position.

Raising and Lowering Planter Frame

Referring to FIG. 11, the central hydraulic cylinder units are schematically shown at 116 and 117. The hydraulic cylinder units associated with the left wing wheels 37 are designated 36A and 36B; and the hydraulic cylinder units associated with the right wing wheels 38 are designated 39A and 39B respectively. All of the hydraulic cylinder units for the wing support wheels (36A, 36B, 39A and 39B) are connected in parallel, the junctions being shown within the manifold block designated 225 in FIG. 11. Moreover, the junctions and passages in the block 225 connect the central hydraulic lift cylinders 116, 117 in a master/slave relationship with their associated wing lift cylinders. Specifically, the barrel end of the central lift cylinder unit 116 is connected to the rod ends of the wing lift cylinders 36A, 36B, which are connected in parallel. Thus, oil flowing from the rod end of the wing cylinders flows into the barrel ends of the central lift cylinder units.

Still referring to FIG. 11, reference numeral 218 refers to a manifold block which includes a first check valve 219, a second check valve 220 and a pressure relief valve 221. The input pressure line 206 is coupled to one port 222 of the manifold block 218, and it then continues via line 206A to one port 223 of the lowering control valve 184 and previously described in connection with FIG. 5a. The other end of valve 184 is coupled to the barrel ends of all four wing lift cylinders in parallel.

To lift the planter to the field turn position, the operator actuates a mechanical lever which energizes a second hydraulic circuit including pressure line 206 and return line 208. Pressurized fluid flows through the line 206, line 206a, lowering control valve 184 (which is open for passage of fluid into port 223), and into port 226 of manifold block 225. From there, the pressurized fluid is fed into the barrel ends of all four wing lift cylinders 36A, 36B, 39A and 39B. As the wing lift cylinders extend, fluid from the rod ends of wing cylinders 36A, 36B flows through the manifold block 225 and into the barrel end of the central lift cylinder 116. Similarly, oil flows from the rod ends of the right side wing lift cylinders 39A, 39B through manifold block 225 via junction 229 and into the barrel end of central lift cylinder 117. It will be recalled that the barrel ends of the hydraulic cylinder units 116, 117 are mechanically tied together by means of a pedestal 110 and cross bar 114 shown in FIG. 3 so that during the lift phase from the field use position to the field turn position, the wing lift cylinders act as master cylinders and the center lift cylinders act as slave units, and the center lift cylinders are tied together and must act in unison.

During this initial lift phase, fluid is returned from the rod ends of the central lift cylinders 116, 117 through a manifold block 232 and the field turn limit valve 170, previously described in connection with FIG. 5, which is normally open. Specifically, a return line 233 couples fluid from the return of the manifold block 232, which receives fluid from the outlet port of the valve 170, through the manifold block 225 and back to the return line 208.

During this phase, the cam arm 174 in FIG. 5 moves from the position of 174C to that designated at 174B, at which time the cam 174A depresses the plunger 172 and causes the valve 171 to shut off, thereby interrupting the flow of return oil from the cylinders 116, 117. This defines the upper limit of the field turn position. When the operator wants to lower the implement back to the field use position, he actuates the mechanical hydraulic control lever to reverse the flow of fluid so that line 208 becomes the pressure line, and line 206 the return line. Fluid is permitted to flow freely through the field turn limit valve 170 in the reverse direction, and the cylinders continue to act in a master/slave relationship so that the wing sections return to the field use position uniformly. The lift and lowering cycles for the field turn position may be repeated indefinitely by the operator because all of the hydraulic cylinder units are purged and re-phased each time the cylinders are fully retracted.

Figure 8D:
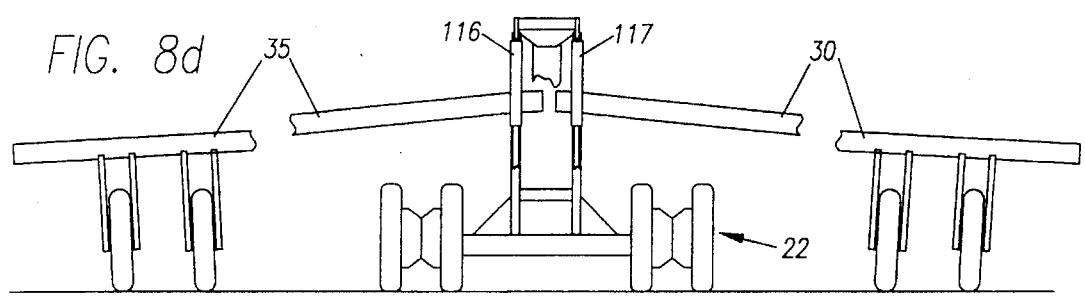
FIGS. 8a–8d are diagrammatic front views of the implement frame showing the wing sections in the various elevations for field use, field turning, and folding.
Figure 8C:
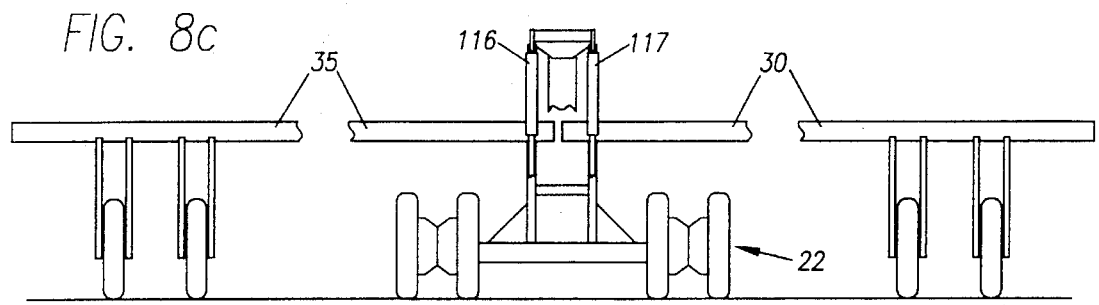
Figure 8B:
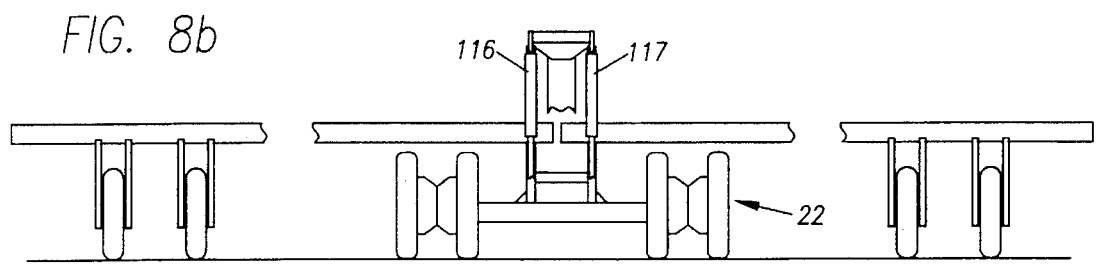
Figure 8A:
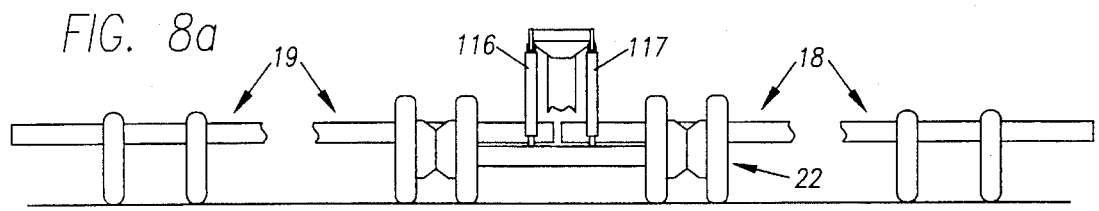

Referring now to FIGS. 8a and 8b, the wing sections are shown in the field use position in FIG. 8a, and in the field turn position in FIG. 8b.

When it is desired to raise the wing sections for transport, the operator actuates the hydraulic system as described above to first raise the frame to the field turn position of FIG. 8b. When the wing sections are in the position of FIG. 8b, by way of example, the wing lift cylinders 36A, 36B, 39A and 39B are at 50% of their extension; and the central lift cylinders 116, 117 are at 25% of their extension. The operator then actuates an electrical switch which energizes the solenoid-actuated check valve 235 in the block 232 to bypass (i.e., shunt around) the field turn limit valve 170, so that oil can continue to flow from the central lift cylinders 116, 117 through line 233 and back to the return line 208. This enables the lift cylinders to continue to extend, and this operation continues until the wing lift cylinders are fully extended. When the wing lift cylinders are fully extended, the wing sections are in the position shown in FIG. 8c (sometimes referred to as the intermediate transport position), and the central lift cylinder units 116, 117 are approximately 75% extended. The wing lift cylinders 36A, 36B, 39A and 39B are provided with bypass passages at their rod ends so that when these cylinders are fully extended, hydraulic fluid may continue to flow under pressure, bypassing the piston. This permits the central lift cylinders 116, 117 to continue to extend to their full extension, and the wing sections then assume the position shown in FIG. 8d (the "full transport" position), with the toolbars extending downwardly and outwardly from the center in the form of a tepee. The additional elevation of the inboard ends of the tubular frame members 30, 35 raises the inboard row units so that they may clear the tires of the main wheel set 22 during the folding cycle. The position shown in FIG. 8c is sometimes referred to as the intermediate transport position to distinguish it from the full transport position of FIG. 8d.

To lower the wing sections from the fully raised transport position shown in FIG. 8d, the operator reverses the pressure in lines 206, 208 so that line 208 becomes the pressure input line and line 206 becomes the return line. Pressure is communicated along line 208, through manifold block 225, and through check valve 235 into the rod ends of the central lift cylinders 116, 117. Pressure is further communicated from the barrel ends of the central lift cylinders through the junction 229 in manifold block 225 to the rod ends of the wing lift cylinders. However, the passage of fluid from the barrel ends of the wing lift cylinders is blocked by the lowering control valve 184 which is not actuated at this time. Pressure builds up in the lines just mentioned until it reaches approximately 1000 psi in the central lift cylinders. At this point, the pressure relief valve 221 opens, and fluid is permitted to flow from the barrel ends of the central lift cylinders 116, 117, through the manifold block 225 and the check valves 219, 220, and the pressure relief valve 221 to the port 222 where it is returned through the line 206. When the center portions of the wing frames return to the position shown in FIG. 8c (that is, the toolbars are horizontal but above the field use position), the lowering control valve 184, as described in connection with FIG. 5a, is opened. This occurs when the follower 193 disengages the inner surface 197 of the cam 195 and rides on the outer surface 196, thereby depressing valve 191 and opening the valve to release pressure. When this occurs, fluid is permitted to flow from the barrel ends of the wing lift cylinders through the manifold block 225 and out of port 226 through the lowering control valve 184 into the return line 206. This permits all six lift cylinders to retract in unison with the cylinders again acting in a master/slave relation because the pressure at port 222 drops when the valve 184 opens, whereby the pressure relief valve 221 closes so that fluid flows directly from the barrel ends of the central lift cylinder units to the rod ends of the wing lift cylinder units, and from the barrel ends of the wing lift cylinder units through the lowering control valve 184 to the return line 206. All of the lift cylinder units are also provided with seal bypass passages at their rod ends so that when they are fully retracted, purging of the fluid lines and rephasing of the cylinders is automatically accomplished each time the unit is placed in the field use position.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. An agricultural implement carrier comprising:

a main frame having forward and rear members extensible and retractable relative to each other in the direction of travel and main support wheel means mounted to said rear member for sliding movement between forward and rear positions;

first power means for selectively extending and retracting said forward and rear members of said main frame;

first and second wing frames, each mounted to the rear of said main frame for swinging movement between a use position and a folded position;

second power means for moving said first and second wing frames between said use and folded positions; and positioning means responsive to the movement of said wing frames from the use position to the folded position for moving said main support wheel means to said forward position on said rear member of said main frame;

said positioning means being further responsive to the movement of said wing frames from the folded position to the use position for moving said main support means wheel to said rear position on said rear member of said main frame.

2. The apparatus of claim 1 wherein said forward and rear members of said main frame comprise forward and rear tubular telescoping members, said forward telescoping member including a hitch for connection to a tractor.

3. The apparatus of claim 2 wherein said main frame further includes a carriage comprising an outer tubular member received on said rear telescoping member; and bearing support means mounting said carriage for sliding movement on said rear telescoping member.

4. The apparatus of claim 3 wherein said positioning means includes positioning link means connected at a rear end to said carriage and constructed and arranged such that said positioning link means pulls said carriage forwardly of said rear telescoping member during the extension of said forward telescoping member.

5. The apparatus of claim 3 wherein said positioning link means comprise first and second positioning links, each connected at their rear ends to said carriage, said apparatus further comprising first and second folding links, each folding link being connected at a forward end to said forward telescoping member and at a rear end to an intermediate location on an associated one of said wing frames, a forward end of each of said positioning links being pivotally and slidably connected to an intermediate location of an associated folding link for sliding motion over a limited distance.

6. The apparatus of claim 5 further comprising a parallel linkage mechanism interconnecting said hitch with the forward end of said forward telescoping member; and an hydraulic lift cylinder having one end connected to said forward telescoping member and the other end connected to said parallel linkage for raising and lowering the forward end of said forward telescoping member relative to said hitch to permit maintaining said main frame in horizontal position in transport as well as in field use positions when said carrier is hitched to a tractor.

7. The apparatus of claim 5 further comprising central lift cylinder means connected between said main support wheel means and said carriage for selectively raising said carriage and the rear end of said main frame to a field turn position and, upon operator actuation, to a full transport position; and first and second wing wheel assemblies, each including hydraulic wing lift cylinder means for selectively raising outboard ends of said first and second wing sections respectively to said field turn position and, upon operator actuation, to said full transport position, said full transport position being characterized in that inboard ends of said wing sections are elevated to positions above the height of the outboard end of the associated wing section.

8. The apparatus of claim 5 further comprising first and second mounting means for mounting respectively the inboard ends of said first and second wing sections to the rear end of said rear telescoping member while permitting said wing sections to flex vertically and independently of each other.

9. An agricultural implement comprising:

a main frame elongated in the direction of travel and including a forward frame member adapted to connect to a hitch of a draft vehicle and a rear frame member mounted to said forward frame member for relative longitudinal motion between an extended and a retracted position;

a wheel axle including ground support wheels mounted on said main frame for sliding motion therealong between a rear and a forward position;

first and second wing sections pivotally mounted at their respective inboard ends to said main frame for swinging movement about associated swing axes between a field use position in which said wing sections are aligned in a direction transverse of the direction of travel, and a folded position in which said wing sections are generally parallel to each other and extend in the direction of travel;

first and second folding links, each having a forward end connected to said forward frame member and a rear end connected respectively to said first and second wing sections respectively, whereby as said main frame is extended, said wing sections pivot forwardly to said folded position and as said main frame is retracted, said wing sections are rotated rearwardly to said field use position; and means responsive to the rotation of said wings from said use position toward said transport position for sliding said wheel axle forwardly on said main frame such that said wheel axle is located in said forward position for transport, thereby to reduce the tongue weight on said tractor hitch.

10. The apparatus of claim 9 wherein said forward and rear frame members of said main frame are in telescoping relation, said apparatus further including a carriage mounted for sliding motion on said main frame in a fore-and-aft direction, and means for mounting said wheel axle to said carriage for supporting a rear end of said main frame.

11. The apparatus of claim 10 wherein said means for sliding said wheel axle comprises first and second positioning links, each having a forward end to an associated one of said folding links.

12. The apparatus of claim 11 wherein said means for connecting said forward ends of said positioning links to associated ones of said folding links each comprise means defining an elongated slot on an associated folding link, including forward and rear stop members limiting motion in said slot, and a slide member pivotally connected to the forward end of an associated positioning link and received in and slidable along an associated slot of one of said folding links.

13. The apparatus of claim 10 further comprising an extension hydraulic cylinder unit having one end connected to the forward telescoping member of said main frame and its other end connected to the rear frame member of said telescoping main frame and operable selectively to extend said main frame; and further including a hydraulic fold assist cylinder means for each wing section for supplying power to assist in the folding and unfolding of an associated wing section, each of said fold assist cylinder means being mounted for swinging about a vertical axis between a first position when the associated wing section is in a field use position and a second position when the associated wing section is in a transport position and characterized in that the leverage induced by said fold assist cylinder means relative to the associated swing axis of an associated wing section is greatest when said associated wing section is in the folded position, whereby said extension cylinder and said wing fold assist cylinder means supplement each other in applying power to fold said wing links throughout the fold and unfold cycles thereof.

14. An agricultural implement comprising:

a main frame having forward and rear members extensible and retractable in the direction of travel and main support wheel means slidably mounted to said rear member for movement between forward and rear positions;

first and second wing frames, each pivotally mounted to said rear member of said main frame for swinging between a field use position and a folded transport position;

tools mounted on each of said wing frames;

first power means for selectively extending and retracting said main frame;

second power means for opening said wing frames to the field use position and for closing said wing frames to the transport position in synchronization with the retraction and extension of said main frame by said first power means respectively; and positioning means for moving said main support wheel means to said forward position on said main frame when said wing frames are moved to said folded position.

* * * * *

UNITED STATES PATENT AND TRADEMARK OFFICE
CERTIFICATE OF CORRECTION

PATENT NO. : 5,488,996
DATED : February 6, 1996
INVENTOR(S) : Alan F. Barry and Harry C. Deckler It is certified that error appears in the above-identified patent and that said Letters Patent is hereby corrected as shown below:

Col. 13, line 40, "57" should be --157--.

Col. 17, lines 27-28, "means wheel" should be --wheel means--; and

Col. 18, line 59, preceding "a forward end", insert --a rear end connected to said carriage and means for connecting--.

Signed and Sealed this

Seventeenth Day of September, 1996

Attest:

BRUCE LEHMAN

Attesting Officer        Commissioner of Patents and Trademarks